United States Patent [19]

Tillotson

[11] Patent Number: 4,584,771
[45] Date of Patent: Apr. 29, 1986

[54] LINE METERING APPARATUS

[75] Inventor: Henry B. Tillotson, Minneapolis, Minn.

[73] Assignee: The Toro Company, Minneapolis, Minn.

[21] Appl. No.: 714,013

[22] Filed: Aug. 13, 1976

[51] Int. Cl.⁴ .......................................... A01D 50/00
[52] U.S. Cl. ...................................... 30/276; 30/347; 56/12.7
[58] Field of Search .................. 30/276, 347; 56/12.7, 56/295

[56] References Cited

U.S. PATENT DOCUMENTS

| 2,709,323 | 5/1955 | Swan | 51/335 |
| 2,771,721 | 11/1956 | Reiman | 51/335 |
| 2,854,798 | 10/1958 | De Haven | 51/335 |
| 3,664,102 | 5/1972 | Reber | 56/295 |
| 3,708,967 | 1/1973 | Geist et al. | 56/12.7 |
| 3,826,068 | 7/1974 | Ballas | 56/12.7 |
| 3,928,911 | 12/1975 | Pittinger | 30/276 |
| 4,107,901 | 8/1978 | Moore | 56/17.5 |
| 4,134,204 | 1/1979 | Perdue | 30/276 |
| 4,524,515 | 6/1985 | Oberg | 30/276 |

Primary Examiner—Jimmy C. Peters
Attorney, Agent, or Firm—Trexler, Bushnell & Wolters, Ltd.

[57] ABSTRACT

Cutting filament metering apparatus for a flexible filament vegetation cutting device in which a flexible filament cutting element is coiled on a filament holder rotatably driven about a substantially vertical axis with a free end of the driven filament defining a cutting plane. The cutting filament metering apparatus includes a driver element rotatably driven about a substantially vertical axis and an engagement member carried by the filament holder for driving engagement with the driver element. An escapement device is also secured to the filament holder and allows limited rotational movement of the holder with respect to the driver element to release a predetermined length of cutting filament. The filament holder is axially biased into a first position in which the driver element engages the engagement device. In one embodiment, the engagement and escapement devices are annular each having teeth circumferentially disposed and projecting radially inward toward the driver axis of rotation. The driver element is provided with driving teeth circumferentially disposed and projecting radially outward from the driver axis of rotation to alternately engage either the teeth on the engagement or escapement devices. Additionally, in certain embodiments, a housing is provided which partially encloses the cutting plane defined by the driven cutting filament and a cutting blade is attached to the housing at the outer periphery of the cutting plane. The cutting blade severs excessive flexible filament to maintain the filament length at a predetermined maximum.

4 Claims, 5 Drawing Figures

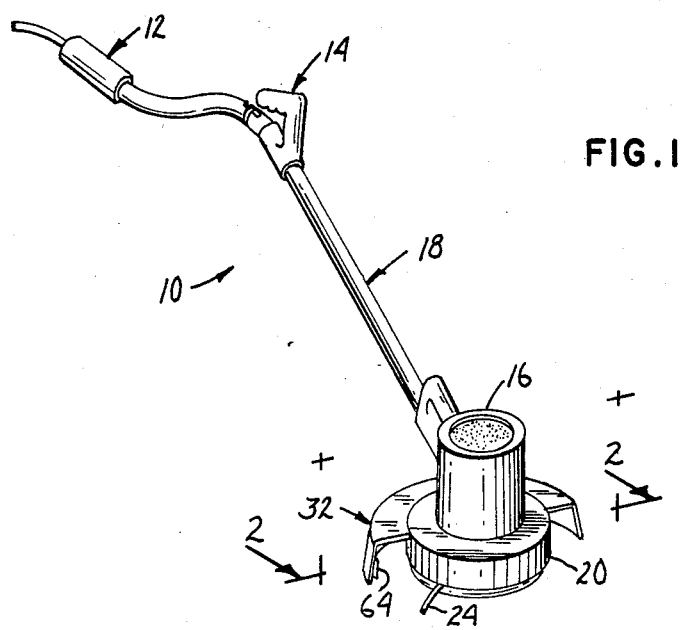
FIG.1
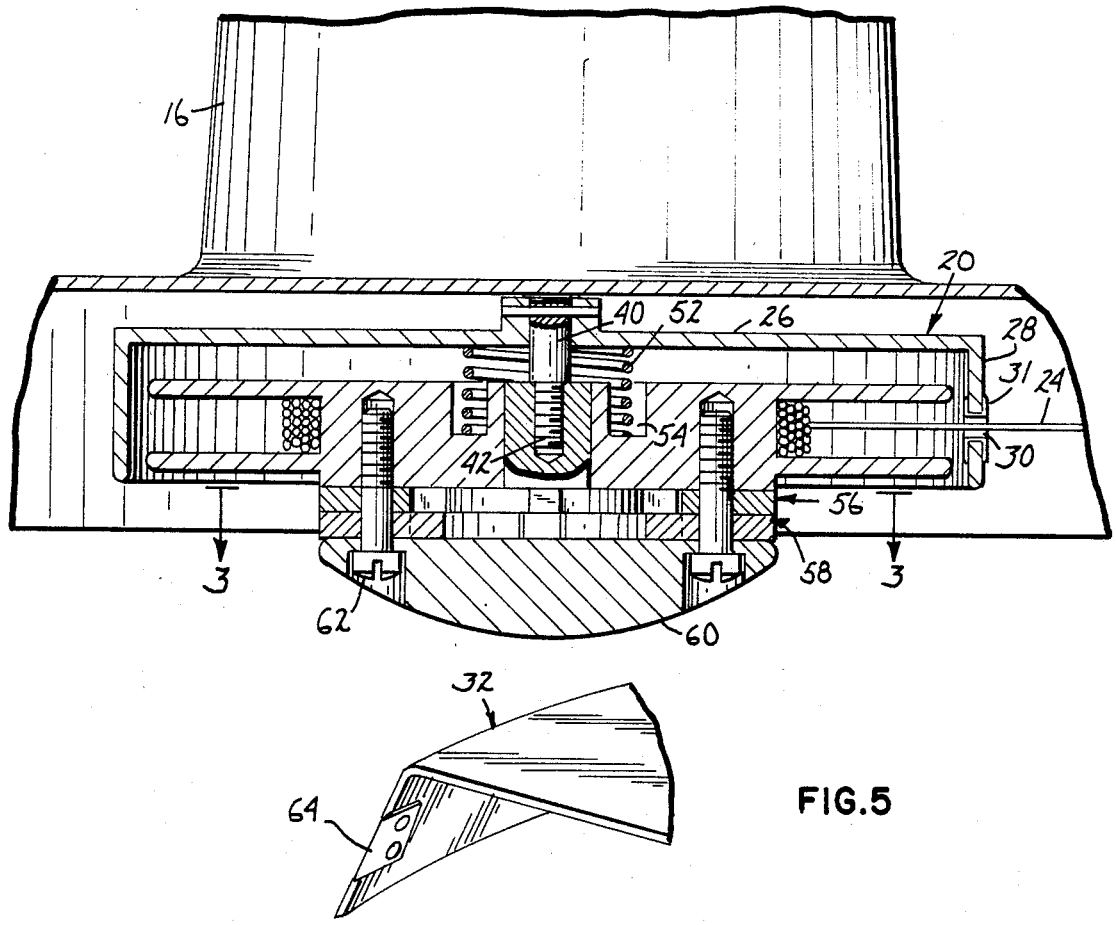
FIG.2
FIG.5

4,584,771

LINE METERING APPARATUS

BACKGROUND OF THE INVENTION

This invention relates to flexible filament cutting devices in general and, more particularly, to an improved device for metering the length of a flexible filament cutting element in such devices. Flexible filament cutting devices generally include one or more flexible filament cutting elements coiled about a spool which is rotated at a high rate of speed to impact cut vegetation for edging and trimming application.

As a result of normal usage, flexible cutting elements often become frayed or broken, thus shortening their effective cutting lengths. Therefore, it is necessary to provide apparatus for uncoiling, playing out, or otherwise providing a new length of flexible cutting element to replace the lengths which become unusable under normal operating conditions. Typically, the rotation of the spool is imparted by a high speed, low torque electric motor. Excessive flexible cutting element length increases the probability of electric motor burn-out. Thus, it is desirable to provide an apparatus which limits the play-out of the flexible cutting element to predetermine discrete increments and furthermore maintains the flexible cutting element length less than a predetermined maximum.

Devices are known in the prior art for metering the length of the flexible cutting element. In one such device, a flexible cutting line is wound about a spool. The spool has a square recess and is spring biased into a position where it engages a square-headed bolt secured to the motor shaft. When it is necessary to uncoil additional cutting line, the device is de-energized and allowed to stop rotating. Then, the spool is manually depressed against the biasing force of the spring to disengage the bolt and recess. The spool is then free to turn. Upon release, it may again engage the bolt head. The operator rotates the spool until he judges that the necessary additional length of flexible line has been removed from the coil.

This device has a number of shortcomings. First, the device must be de-energized and allowed to stop rotating prior to line metering. Second, the line must be manually pulled out from the spool to increase effective cutting line length. Third, the amount of line added is controlled primarily by the operator's estimate as to the needed additional length. Fourth, the maximum length of the cutting line is limited only by the amount of line pulled out by the operator. If, therefore, excess flexible cutting line is uncoiled, the probability of electric motor burn-out increases substantially.

The present invention eliminates the disadvantages inherent in the prior art devices in that it provides a positive escapement means which limits the play-out of the flexible cutting element to discrete predetermined increments. Additionally, a cutting blade is provided to sever excessive flexible cutting element when the length exceeds a predetermined maximum value. Finally, the present invention automatically meters flexible cutting element while the device is operating as opposed to requiring that the device be de-energized prior to metering the additional flexible cutting element.

SUMMARY OF THE INVENTION

The present invention is a cutting filament metering apparatus for a flexible filament vegetation cutting device in which a flexible filament cutting element is coiled about a filament holder and includes a driver element rotatably driven about a substantially vertical axis, and engagement means carried by the filament holder to provide a driving engagement with the driver element. The metering apparatus further includes biasing means for biasing the filament holder along the substantially vertical axis into a position whereby the engagement means engages the driver element. Additionally, escapement means is provided to allow limited rotational movement of the filament holder with respect to the driver element when the filament holder is translated to a second position to allow metering of the filament.

In one specific class of embodiments, the filament holder is a spool about which the flexible filament cutting element is coiled. A toothed driver element is secured to the shaft of the device motor. Attached to the spool is a first annular engagement means having radially inward directed, circumferentially spaced teeth for driving engagement with the teeth of the driver element. A second annular engagement means is secured to the spool at a second axially spaced position with respect to the first means. It also has radially inward directed circumferentially spaced teeth, but these are staggered with respect to those of said first means. A spring biases the spool to a first axial position in which the teeth of the driver element engage the teeth of the first engagement means. When it is desired to meter flexible filament, the spool is caused to undergo axial translation to a second axial position in which the teeth of the driver element are in the plane of the second engagement means. The centrifugal force on the free end of the flexible filament imparted by the high speed of rotation causes the spool to rotate until the teeth of the driver element engage the teeth on the second engagement means. The spool is then allowed to return under the influence of the biasing force to its first axial position undergoing additional rotation until the driver teeth again engage the teeth of the first engagement means. Thus, a predetermined limited length of flexible filament is unwound from the filament coil.

In some specific embodiments, the translation of the filament holder is achieved by providing a ground engaging cover secured to the spool. The cover is placed against the ground and the operator applies downward pressure against the axial biasing force. In the alternative embodiment, a mechanical linkage may be provided between the spool and the operator handle to cause the spool to undergo the desired translation.

Additionally, some embodiments may provide a cutting blade disposed in the circular path of the flexible filament cutting element to limit the maximum length of the flexible filament cutting element. The cutting blade severs any excessive flexible filament cutting element as the filament rotates.

These and other features of the various embodiments of my invention will become apparent upon consideration of the drawings, description of the preferred embodiment, and claims.

BRIEF DESCRIPTION OF THE DRAWINGS

FIG. 1 is a view in perspective of a flexible filament vegetation cutting device incorporating the present invention;

FIG. 2 is a sectional view taken generally along line 2—2 of FIG. 1;

FIG. 5 is a fragmentary detained perspective of a portion of FIG. 1.

DESCRIPTION OF THE PREFERRED EMBODIMENT

Figure 4:
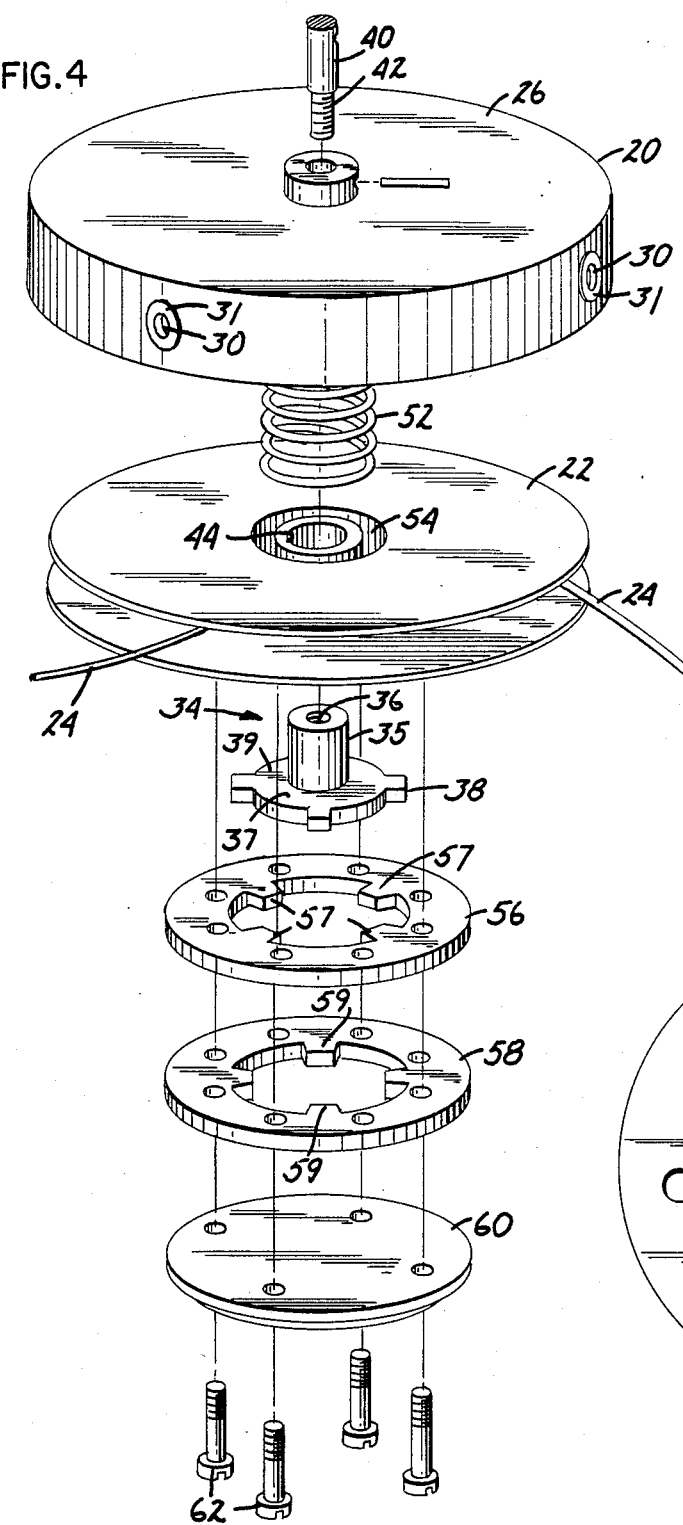
FIG. 4 is an exploded perspective of the preferred embodiment of the present invention.

Referring to the drawings, wherein like numerals represent like parts throughout the several views, there is shown in FIG. 1 a flexible filament vegetation cutting device generally designated at 10 incorporating the present invention in filament metering apparatus. The cutting device has a pair of operator grasping handles 12 and 14 and a housing 16 enclosing a motor (not shown) for rotatably driving a flexible filament. Motor housing 16 is connected to operator handles 12 and 14 by handle extension 18. An inverted dish-shaped housing 20 partially encloses a filament holder 22, which in the embodiment shown, is a spool-like element, about which is wound a flexible filament cutting element 24. Housing 20 has a circularly shaped base 26 and a generally cylindrical sidewall 28 extending downward thereof, with one or more apertures 30 spaced about said sidewall through which a free end flexible cutting filament 24 extends. Aperture 30 may be provided with a grommet 31 that provides a wear surface for filament 24. A shield 32 may be secured to motor housing 16 and disposed on the side of the motor housing to which extension boom 18 is attached. Shield 32 partially encloses the cutting path defined by the rotation of the free end of flexible cutting filament 24.

Figure 3:
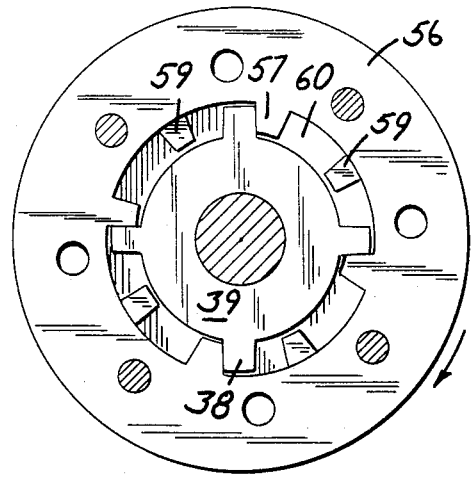
FIG. 3 is a sectional view taken generally along line 3—3 of FIG. 2.

One embodiment of the cutting filament metering apparatus is specifically illustrated in FIGS. 2–4. In those figures, a toothed driver element 34 with a cylindrical coupling portion 35 having a threaded aperture 36 and a base portion 37 with a plurality of driving projections or teeth 38 circumferentially disposed in equally spaced radial increments with respect to a substantially vertical axis is shown. Driver element 34 also has a top surface 39 engaging spool 22. The driving motor has a shaft 40 to which driver element 34 may be attached. In the embodiment shown, attachment is by means of an externally threaded projection 42 threadedly received within aperture 36.

As previously mentioned, in the preferred embodiment, flexible cutting filament 24 is coiled about a spool 22. At its central axis, spool 22 has a cylindrical aperture 44 which receives a cylindrical portion 46 of driver element 34. A spring 52 is disposed within an annular recess 54 in spool 22. The spring also rests against base 26 of housing 20 and applies a force to bias spool 20 downwardly toward a first position along the spool axis such that the spool contacts surface 39. While in the embodiment illustrated, the spool axis coincides with the substantially vertical rotational axis, it is not felt that such axial alignment is essential to the present invention.

Axially disposed along the spool axis is a first annular engagement means 56 for driving engagement with driver element 34 and a second annular engagement means 58 which, in combination with means 56, functions as an escapement mechanism. First engagement means 56 has a plurality of radially inwardly directed projections or teeth 57 disposed at spaced intervals about its circumference. Second engagement means 58 also has a plurality of teeth 59 disposed in spaced intervals about its circumference and projecting radially inward. Teeth 57 and 59 are circumferentially offset with respect to each other. In one embodiment, first and second engagement means 56 and 58, together with a cover 60, are secured to spool 22 by a plurality of machine screws 62. In alternative embodiments, first engagement means 56 and/or second engagement means 58 may be molded integrally with spool 22.

As shown in FIG. 5, a cutting blade 64 may be secured to shield 32 and positioned in the path of flexible cutting filament 24. If the length of filament 24 exceeds a predetermined maximum, blade 64 will sever the filament as it rotates in its circular cutting path. Excess flexible cutting filament is thus removed automatically by blade 64.

Under normal operating conditions, driving teeth 38 engage teeth 57 on first engagement means 56 in the first axial position of spool 22. Flexible cutting filament 24 defines a basically circular cutting path. Flexible cutting filament 24 may become shortened during normal use. When it is desired to increase the effective cutting length of flexible cutting filament 24 during use, the operator may place the cover 60 into contact with the ground and press downward. Rotating spool 24 then translates axially toward base 26 against the biasing force of spring 52 to a second axial position, and teeth 58 disengage from teeth 57. Driver element 34 is then disposed with driving teeth 38 in the plane of second engagement means 58. Due to its own rotational momentum, spool 22 undergoes limited rotation until teeth 38 engage teeth 59. As the flexible cutting line 24 is rotating at a rapid rate during the cutting and metering operation, the centrifugal force generated by the free end of rotating flexible cutting filament 24 pulls a discrete increment of filament from spool 22. The operator then raises cover 60 from ground contact and spring 52 biases spool 22 to its first axial position and an additional discrete increment of flexible cutting filament uncoils during the return of the spool to its first axial position and rotation of the spool until teeth 38 again engage teeth 57. Thus, flexible cutting element 24 is lengthened a discrete predetermined amount in response to "tapping" action of the unit upon a ground surface. As previously mentioned, if the added increment makes the flexible cutting filament longer than a predetermined maximum, the excess filament is removed by blade 64, which severs flexible cutting filament 24 as the filament rotates in its circular cutting path.

It will be understood that, as an alternative, a mechanical linkage might be connected between spool 22 and operator handles 12 and 14 so that the operator could simply control the axial translation of spool 22 without the necessity of placing cover 60 into ground engagement followed by the downward application of pressure. Additionally, as shown in FIG. 4, a plurality of flexible cutting elements 24 could be independently wound about spool 22 and the described flexible cutting filament metering apparatus would serve to simultaneously meter filament for each cutting element.

Thus, the present invention provides metering of a flexible cutting filament in discrete predetermined increments automatically while the flexible filament vegetation cutting device is operating. Additionally, the maximum length of the cutting filament is limited, thereby substantially decreasing the possibility of motor burn-outs as a result of excessive length of the flexible cutting filament.

I claim:

1. Apparatus for cutting vegetation and the like by means of a flexible cutting filament rotatably operable within a cutting plane, said apparatus comprising a rotatable head structure operable about an axis generally perpendicular to said cutting plane, means for rotating said head structure, a spool rotatable with said head structure and also rotatably shiftable in respect thereto, said spool and head structure also being relatively axially shiftable, said spool being arranged to carry a supply of filament and emit a predetermined increment thereof upon relative rotation between said spool and said head structure, and means for controlling said relative rotation by the relative axial shifting of said spool and head structure, said control means comprising two sets of interengageable detents, one set comprising two axially spaced rows of detents and the other set comprising a row of detents selectively engageable with either of said first named rows, one set of detents being provided upon a pair of independently fabricated members cooperatively associated with said spool for rotation therewith.

2. Apparatus as set forth in claim 1 wherein said members are secured to but separable from said spool, and threaded fastener means is provided for securing said members in position.

3. Apparatus for cutting vegetation and the like by means of a flexible cutting filament rotatably operable within a cutting plane, said apparatus comprising a rotatable head structure operable about an axis generally perpendicular to said cutting plane, means for rotating said head structure, a spool rotatable with said head structure and also rotatably shiftable in respect thereto, said spool and head structure also being relatively axially shiftable, said spool being arranged to carry a supply of filament and emit a predetermined increment thereof upon relative rotation between said spool and said head structure, and means for controlling said relative rotation by the relative axial shifting of said spool and head structure, said control means comprising two sets of interengageable detents, one set comprising two axially spaced rows of detents and the other set comprising a row of detents selectively engageable with either of said first named rows, one set of detents comprising a plate member having said detents circumferentially formed thereon.

4. Apparatus as set forth in claim 3 wherein said one set of detents comprises a pair of independently fabricated plate members having said detents circumferentially formed thereon.

* * * * *